(12) United States Patent
James

(10) Patent No.: US 9,163,369 B2
(45) Date of Patent: Oct. 20, 2015

(54) ENERGY ABSORPTION DEVICE

(75) Inventor: Dallas Rex James, Auckland (NZ)

(73) Assignee: Valmount Highway Technology Limited, Auckland (NZ)

( * ) Notice: Subject to any disclaimer, the term of this patent is extended or adjusted under 35 U.S.C. 154(b) by 199 days.

(21) Appl. No.: 13/263,485

(22) PCT Filed: Apr. 7, 2010

(86) PCT No.: PCT/NZ2010/000064
§ 371 (c)(1),
(2), (4) Date: Jan. 5, 2012

(87) PCT Pub. No.: WO2010/117283
PCT Pub. Date: Oct. 14, 2010

(65) Prior Publication Data
US 2012/0118690 A1     May 17, 2012

(30) Foreign Application Priority Data

Apr. 7, 2009    (NZ) ........................................ 576140

(51) Int. Cl.
*F16F 7/12*     (2006.01)
*E01F 15/08*     (2006.01)
*E01F 15/14*     (2006.01)

(52) U.S. Cl.
CPC .............. *E01F 15/086* (2013.01); *E01F 15/085* (2013.01); *E01F 15/141* (2013.01); *F16F 7/12* (2013.01)

(58) Field of Classification Search
CPC .............. F16F 7/12; F16F 7/121; F16F 7/124
USPC ..................... 188/371, 372, 376, 377; 404/10
See application file for complete search history.

(56) References Cited

U.S. PATENT DOCUMENTS

| | | | | |
|---|---|---|---|---|
| 4,029,350 A | * | 6/1977 | Goupy et al. | ................. 188/377 |
| 4,118,014 A | * | 10/1978 | Frosch et al. | ................. 188/377 |
| 4,492,291 A | * | 1/1985 | Chometon et al. | ............ 188/377 |
| 5,193,246 A | | 3/1993 | Huang | |
| 5,355,552 A | | 10/1994 | Huang | |
| 5,605,413 A | | 2/1997 | Brown | |
| 5,779,389 A | | 7/1998 | Niemerski | |
| 5,804,030 A | * | 9/1998 | Jaegers et al. | ................. 156/510 |
| 6,932,537 B2 | | 8/2005 | Witcher | |
| 6,959,894 B2 | * | 11/2005 | Hayashi | ........................ 188/377 |

(Continued)

FOREIGN PATENT DOCUMENTS

| | | | |
|---|---|---|---|
| DE | 19856162 A1 | * | 6/2000 |
| EP | 1426289 A1 | | 6/2004 |
| EP | 2505490 A1 | * | 10/2012 |

(Continued)

OTHER PUBLICATIONS

Patent Examination Report No. 1 for Australian Patent Application No. 2010235275 dated Sep. 4, 2014.

(Continued)

*Primary Examiner* — Thomas J Williams
(74) *Attorney, Agent, or Firm* — Greer, Burns & Crain, Ltd.

(57) ABSTRACT

An energy absorbing device having a shell comprising at least one external wall defining an internal area, wherein said internal area is further defined by one or more interior wall(s) spanning across at least a portion of said internal area, between opposing sections of said external wall(s).

16 Claims, 4 Drawing Sheets

(56) References Cited

U.S. PATENT DOCUMENTS

| | | |
|---|---|---|
| 2003/0095834 A1 | 5/2003 | Witcher |
| 2004/0051366 A1 | 3/2004 | Hsin |
| 2004/0195064 A1 | 10/2004 | Tamada et al. |
| 2005/0001093 A1 | 1/2005 | Hayashi |
| 2008/0203749 A1* | 8/2008 | Tamada ........................ 296/1.04 |
| 2010/0287715 A1* | 11/2010 | Voyiadjis et al. ............. 188/377 |

FOREIGN PATENT DOCUMENTS

| | | |
|---|---|---|
| WO | 9955970 A1 | 11/1999 |
| WO | 0240779 | 5/2002 |

OTHER PUBLICATIONS

European Search Report for European Patent Application No. 10761919.9-1755 / 2417299 dated Apr. 2, 2015.

* cited by examiner

ENERGY ABSORPTION DEVICE

STATEMENT OF CORRESPONDING APPLICATIONS

This application is based on the Provisional Specification filed in relation to New Zealand Patent Application Number 576140, the entire contents of which are incorporated herein by reference.

TECHNICAL FIELD

This invention relates to an energy absorbing device.

BACKGROUND ART

A wide variety of energy absorbing apparatus are available for use in situations where it is desirable to absorb the energy of an impact.

For ease of reference only, the present invention will now be described with regard to roading applications, where impact of an erratic vehicle with a stationary object, (such as for example only: a wall, utility, pole or tree) can cause severe injury and/or death to occupants travelling in the vehicle. Similarly, vehicles that have been driven off course may be significantly slowed down by contact with an energy absorbing apparatus, reducing the danger when entering areas of risk, particularly at high speeds.

Vehicle collisions with stationary objects are a large contributor to deaths and serious injuries. To reduce the damage to occupants during a collision, a number of assemblies have been devised to absorb and/or transfer the energy from the impact.

It is well known to use containers filled with water or sand as energy absorbing devices between roadways and stationary objects. One of the major disadvantages of this system is that the devices are relatively heavy, and in the case of the water filled devices, often difficult to maintain.

It is also well known to use air tight containers to absorb impact energy. These are somewhat effective, however once the container has had an initial impact and the container shattered or broken, there is no further way that energy can continue to be absorbed. These containers are known to be used both on land and sea, however they are not particularly effective when receiving a high energy impact.

U.S. Pat. No. 5,123,775 describes an impact attenuator to absorb the impact of vehicular collisions. The device described in this patent includes a fibreglass shell which defines a cavity in the interior thereof. Housed within the cavity is a plurality of layers of empty aluminium beverage cans. Each layer consists of a plurality of cans stacked end to end in a number of columns in the direction of anticipated impact. Each of the layers is then separated by a cardboard divider to maintain separation between the layers, and the assembled cans are then surrounded by a burlap shroud before being encased within the fibreglass shell.

This assembly has a number of disadvantages. As the aluminium cans are stacked end to end within the layers, the device will only function at its most effective when the collision occurs in a direction which is head-on into the end of the cans. This limits the types of situation where this assembly can be used and also may increase risk to a vehicle occupant if the apparatus is impacted from the non-preferable angle. Additionally as the individual layers of cardboard and cans are not fixed together, the energy absorbed on impact is not readily transferred throughout all layers of the device, limiting the effectiveness of the entire device to absorb impact. This system is also fairly labour intensive to produce, as individual cans need to be correctly positioned within columns and then layers, with cardboard dividers. The can and cardboard interior needs to then be encased in a burlap sack, then inserted within a fibreglass shell, making the process of producing the assembly time consuming and labour intensive.

A number of other roading barriers are known, such as those constructed using tyres. One such longitudinal barrier is described in WO 03/097964. This patent specification describes a longitudinal barrier constructed from a plurality of tyres that are configured in a staggered brick type fashion or are stacked on top of each other to form columns. The tyres are held in position by a series of cables, wire rope, or stakes depending on the configuration of the tyres. One disadvantage with this system is that tyres solely absorb the impact of a vehicle. For example the energy of the impact is only transferred to horizontally adjacent tyres via upright supports (binding devices 16, 26 or 47) The binding devices have a small surface area so the transfer of force to a tyre is limited. This invention is also labour intensive as it requires holes 13 to be cut into the tyres, refer to FIGS. 1, 3 and 5. Once the tyres have had holes introduced to them, there is a reduction in the amount of energy that can be absorbed or transferred through the system, further reducing the effectiveness of the tyres in absorbing impact. The barrier of WO 03/097964 is also limited slightly in that it is not surrounded by an outer shell or casing. The addition of an outer casing or shell seals the air inside the barrier, providing further resistance when the barrier is absorbing an impact.

In summary, the problem with the prior art assemblies such as shown in U.S. Pat. No. 5,123,775 and WO 03/097964 is the fact the vehicle itself still has to absorb the majority of the force of impact, which cannot be transferred or absorbed by the assembly, for the reasons mentioned above. In the case of U.S. Pat. No. 5,123,755 the impact absorption efficiency is limited is by the aluminium cans not being connected to either each other or the layered cardboard. On impact, the cans may fall apart from each other once the fibreglass housing has been shattered, further increasing the energy that needs to be absorbed by the vehicle instead of the barrier. These problems occur due to both prior art assemblies relying on the resilience of the individual materials to absorb the majority of the impact. Each of the above assemblies are also potentially time consuming and labour intensive to manufacture on a large scale.

It would therefore be useful to have an assembly where the elements within the assembly are all interconnected in such a way, to increase the amount of energy that is absorbed and/or transferred to the assembly from an impacting vehicle, thereby decreasing the amount of force conveyed back to the occupants of the colliding vehicle. Additionally, it would also be an advantage to have an assembly that could be quickly and easily manufactured using readily available materials. It would be a further advantage to have an assembly that could be constructed in a range of shapes, such as; circular, square; a line, to suit a range of applications, without being expensive to construct.

Conventional energy absorbing apparatus and road barriers including those as described above only utilise a single type of energy absorbing element. It would also be useful if there could be provided an energy absorbing device which can utilise at least 2 types of energy absorbing elements.

It is an object of the present invention to address the foregoing problems or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

Further aspects and advantages of the present invention will become apparent from the ensuing description which is given by way of example only.

DISCLOSURE OF THE INVENTION

According to one aspect of the present invention there is provided an energy absorbing device having a shell comprising at least one external wall defining an internal area, wherein said internal area is further defined by one or more interior wall(s) spanning across at least a portion of said internal area between opposing sections of said external wall(s).

According a further aspect of the present invention there is provided an energy absorbing device wherein said interior wall(s) define a further space within the interior area of the shell.

In further preferred embodiments the one or more interior wall(s) span between opposing external walls of the shell such that the internal space spans across the shell.

Most preferably, in use, the further space spans across the shell in a direction substantially parallel to the orthogonal to the general direction in which an impact is expected.

The further space is in most embodiments generally open to the ambient environment. However, in some further embodiments the further space may be sealed by a section of the shell.

According to another aspect of the present invention there is provided a method of manufacturing a device to absorb impact energy, characterised by the step of creating a shell comprising at least one external wall defining an internal area, wherein said internal area is further defined by one or more interior walls spanning across at least a portion of said internal area between opposing sections of said wall(s).

For the purposes of this invention the term "wall" should be taken to mean any surface that can be used to define a space or act as a boundary between spaces.

In a preferred embodiment of the invention, the shell is made from substantially inflexible material. Ideally, the material should be capable of being compressed when impacted by a force of sufficient magnitude. For example, in roading applications a force of sufficient magnitude will exist when a vehicle collides with the energy absorbing device.

In preferred embodiments the material from which the shell is made may be moulded plastic, such as for example only, medium density polyethylene. In some alternative embodiments the shell material may be metal.

It will be appreciated by those skilled in the art that this list of possible materials from which the shell may be made is not intended to be exhaustive nor limiting.

It will also be appreciated by those skilled in the art that what constitutes a force of sufficient magnitude will vary depending on the situation in which the energy absorbing device is designed to absorb energy. Thus, the type and thickness of material may vary depending on the situation.

In further preferred embodiments the shell is substantially airtight. The inventor has found that air trapped within the internal area can provide, a degree of resistance to the force of an impact from an oncoming vehicle or similar, during the period that the air is compressed within the internal area, upon deformation of the shell.

The shell and air (or other compressible fluid) housed within therefore constitutes a first type of energy absorbing element. In such further preferred embodiments the interior walls also become compressed during an impact to constitute a second type of energy absorbing element. If the further space created by the interior walls is sealed any air or other compressible fluid housed within can constitute a third type of energy absorbing element.

Preferably, the shell is substantially rectangular in shape, although it is envisioned that the housing may be made into any shape as may be needed for a specific site or area to be protected.

The interior walls of the energy absorbing device are preferably formed from a substantially inflexible material which is the same or similar to that as those used in the shell. This is not however intended to be limiting and the internal walls may be formed from a different material to that of the external walls.

It is envisaged the further space formed by the interior walls may have a variety of different cross-sectional shapes.

In preferred embodiments the further space may have a substantially circular or octagonal cross-sectional shape. However, it should be appreciated that the interior walls may form further spaces with other cross-sectional shapes such as triangular, square or hexagonal, without departing from the scope of the present invention.

In variations of the apparatus of the present invention it is envisioned that the shell may contain a plurality of further spaces created by internal walls.

In an embodiment where the device includes more than one further space, it is preferable that the further spaces defined by interior walls are orientated to be aligned parallel with respect to each other within the internal area of the shell.

In one embodiment of the invention the exterior and interior walls may be integrally formed. Alternatively, in other variations the exterior walls may be formed separately and filled with circular or octagonal tubing to create the interior walls.

The energy absorbing device of the present invention, in addition to being used on its own, may also be used as an individual energy absorbing module that may be inserted within a further safety device to increase the efficiency of a barrier or crash cushion.

According to a further aspect of the present invention there is provided a housing adapted for surrounding stationary objects wherein said housing includes a number of energy absorbing devices substantially as described above. For example, the stationary object may be a tree or pole. The housing may be configured as a module which can connect to one or more other modules to provide an impact cushion which can surround the stationary object. In such embodiments the housing may include a connecting portion for attaching to adjacent modules.

Alternatively, the shell of may be configured to function as a module without the need for a separate housing. For example, the shell may have a connecting portion which attaches to an adjacent module such that a number of modules may be arranged and fastened together without the need for additional surrounding housing. In this embodiment the modules may be configured for attachment such that the individual modules can be linked together in a row or stacked to form a larger energy absorbing device. The modules may be attached together by means of cables, wires, hooks or click-fit arrangements as would be understood be a person skilled in the art.

According to another aspect of the present invention there is provided a method of surrounding a stationary object the method comprising connecting two or more:
  housings substantially as described above; or
  energy absorbing devices substantially as described above;
so as to surround the stationary object.

According to a further aspect of the present invention there is provided a method of absorbing energy from a moving object upon impact wherein the method comprises the step of: utilising at least two types of energy absorbing elements to absorb the energy of the impact in an energy absorbing apparatus; wherein the first type of element can absorb at least 50-90% of the energy absorbed by the apparatus and wherein the subsequent type(s) of element continues to absorb energy after the first type of energy absorbing element(s) has/have ceased operation and can no longer absorb energy.

Preferred embodiments of the device of the present invention may have a number of advantages over the energy absorbing devices currently known. The interior walls of the device provide additional energy absorption to the housing when absorbing an impact. After an initial impact which may destroy the housing of the device, the interior walls and/or further space provide energy absorbing zones, decreasing the amount of energy needing to be reabsorbed by the impacting vehicle or similar.

In the preferred embodiments the interior walls are substantially tubular in shape and can therefore effectively absorb impact energy from almost any direction, making the device suitable for use in a wide range of situations.

Preferred embodiments of the device are also advantageous over other known energy absorption apparatus in that they can be used on both land and water. When manufactured from plastics material the device of the present invention can float and is therefore suitable for impact absorption in marine environments. For example, the present invention can be used as a boat racing crash barrier or as protection around stationary objects such as wharves.

Preferred embodiments of the present invention are also economical, lightweight and relatively simple to produce and can easily be moved and replaced when necessary.

BRIEF DESCRIPTION OF THE DRAWINGS

Further aspects of the present invention will become apparent from the following description which is given by way of example only and with reference to the accompanying drawings in which.

BEST MODES FOR CARRYING OUT THE INVENTION

Figure 1:
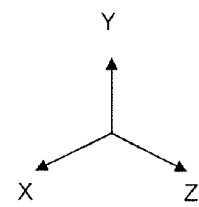
FIG. 1 shows a perspective view of the energy absorbing device of the present invention.
Figure 1:
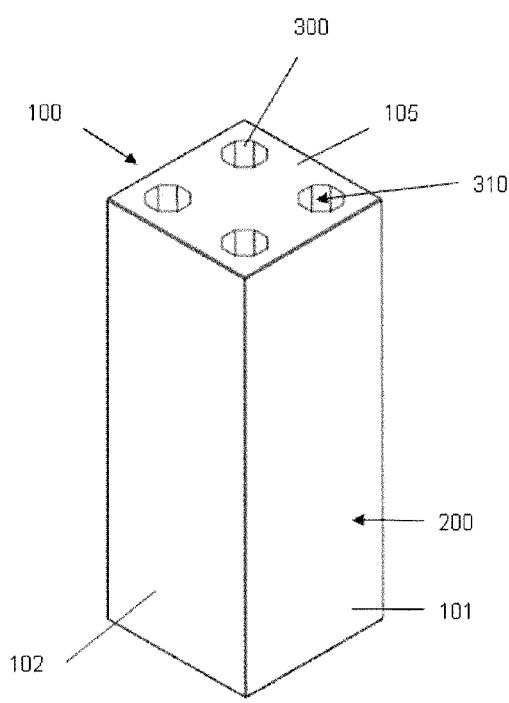
Figure 2:
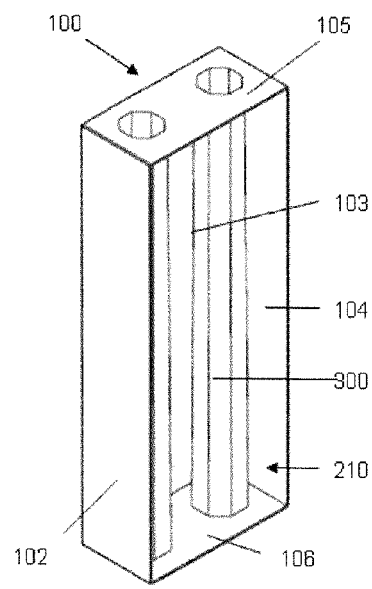
FIG. 2 shows a perspective cross section of the energy absorbing device of FIG. 1.

FIGS. 1 and 2 show an energy absorption device 100 in accordance with one preferred embodiment of the present invention. The energy absorption device 100 is made from medium density polyethylene and has 6 external walls 101-106 which form an outer rectangular shell 200. As best seen in FIG. 2 the shell 200 defines a first internal area 210 that acts as an air cushion when the device 100 is sealed on all sides as shown in FIG. 1.

The first internal area 210 is further defined by interior walls 300. As shown in FIGS. 1 and 2, interior walls 300 span across internal area 210 of the shell, running parallel between opposing sides of the shell 200. Interior walls 300 are octagonal in shape and define a space 310 within interior walls 300. In this embodiment there are four interior walls 300 shown, however it is envisioned that there may be any number of interior walls 300 located within shell 200.

In use, device 100 may be positioned to receive an impact from direction X, Y or Z or any angle in between as indicated by the axis in FIG. 1. On impact, shell 200 contains air which is compressed by the initial energy of impact and this absorbs the majority of the impact energy then when the shell ruptures the remaining impact energy is transferred to (i.e. absorbed by) interior walls 300 which get crushed, absorbing more energy from the impact. As would be appreciated by a person skilled in the art, the more interior walls 300 positioned within housing 200 the more surfaces will be available for absorbing impact energy.

The devices 100 of the present invention may also be used as modules arranged within a further housing or arranged together to form a larger energy absorbing device.

Figure 3:
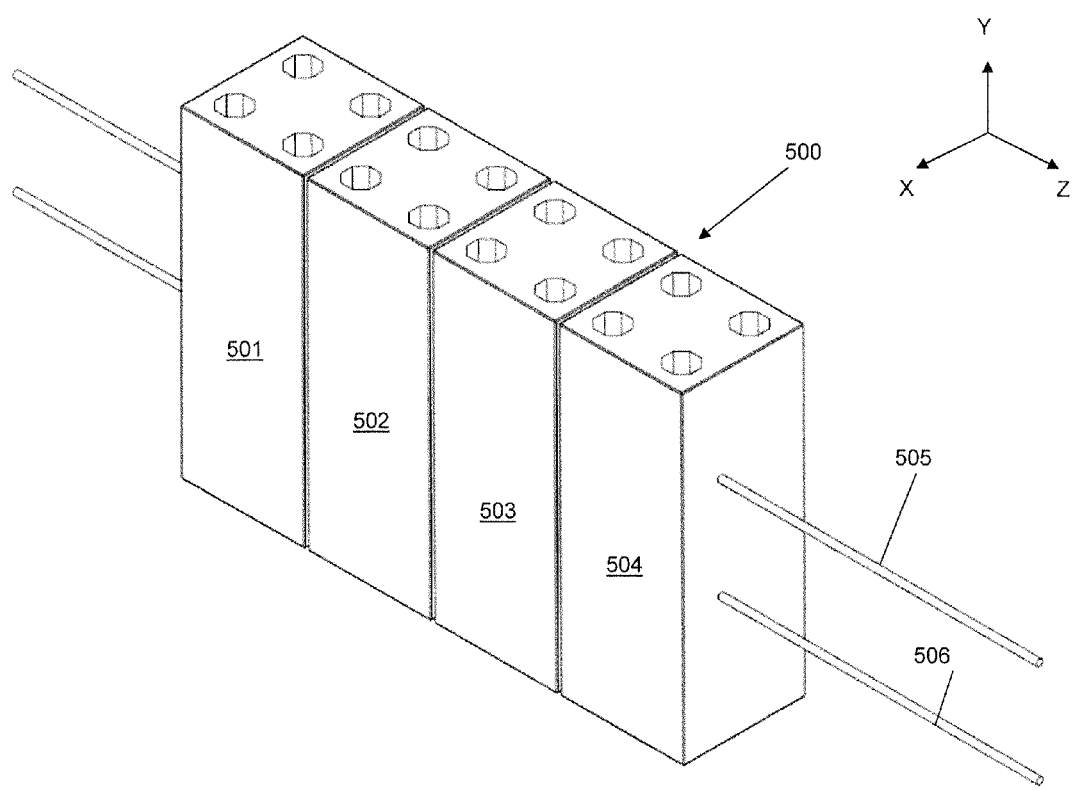
FIG. 3 shows a perspective view of modular safety device in accordance with one preferred embodiment which includes a number of energy absorbing devices as shown in FIG. 1.

FIG. 3 shows a modular safety device generally indicated by arrow 500. The modular safety device 500 has four energy absorbing devices 501-504 which are connected by cables 505 and 506 which pass through apertures (not shown) in the energy absorbing devices 501-504. The modular safety device 500 in use can be wrapped around an object (not shown).

For example the modular safety device 500 can have multiple energy absorbing elements and can be wrapped around a power pole (not shown) one or more times to create one or more protective layers about the pole.

Although not shown it should be appreciated that the energy absorbing elements 500 can also be orientated so as to absorb the energy of an impact along the longitudinal axis of the device 500.

Figure 4:
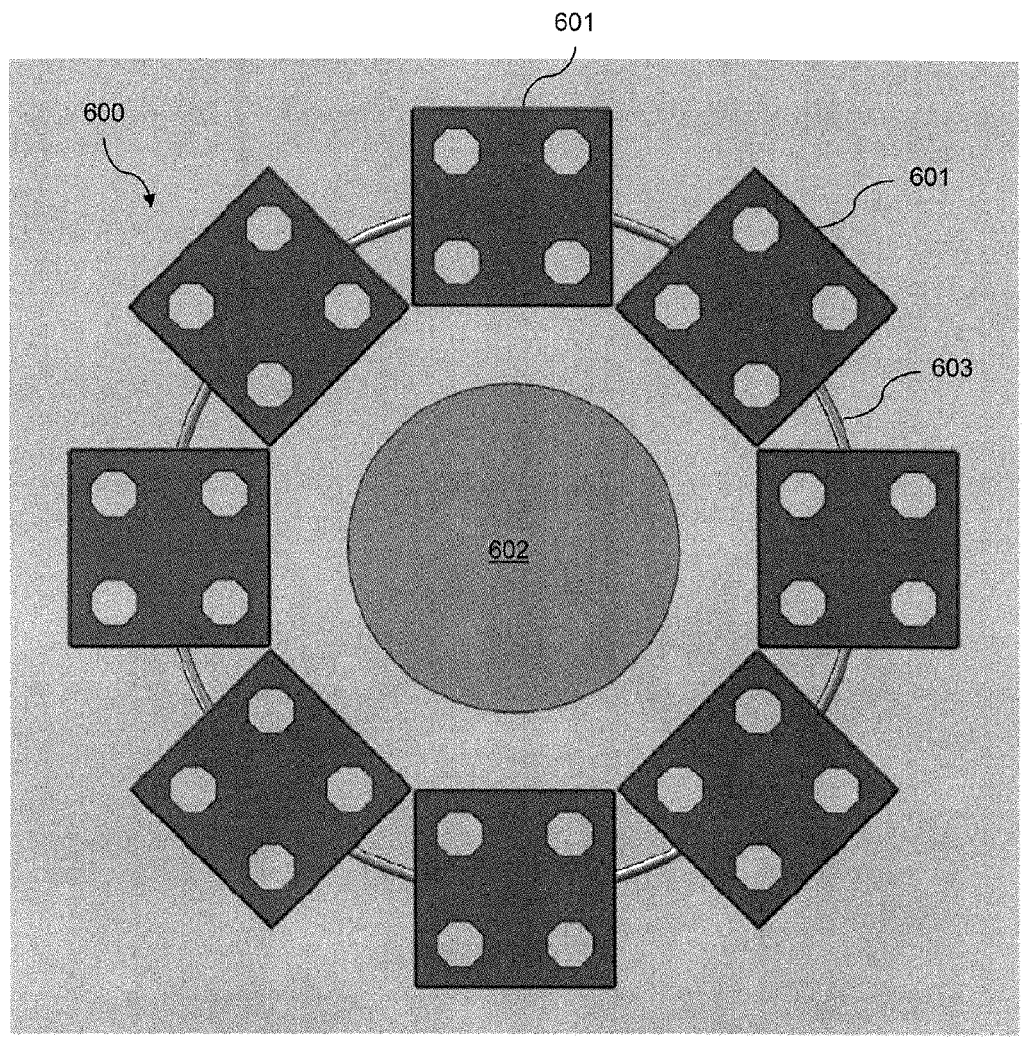
FIG. 4 shows a plan view of a modular safety device in accordance with another preferred embodiment which includes a number of energy absorbing devices shown in FIG. 1.

FIG. 4 shows a modular safety device 600 which has number of modular energy absorbing devices 601 which surround the trunk of a tree 602. The energy absorbing devices 601 have apertures in the form of an integrally moulded tube (not shown) which passes from side to side to enable connection of adjacent energy absorbing devices 601. The energy absorbing devices 601 are connected via a cable 603 which is threaded through adjacent energy absorbing devices which are then wrapped around a tree and the two cable ends are clamped together so as to form a ring.

Figure 5:
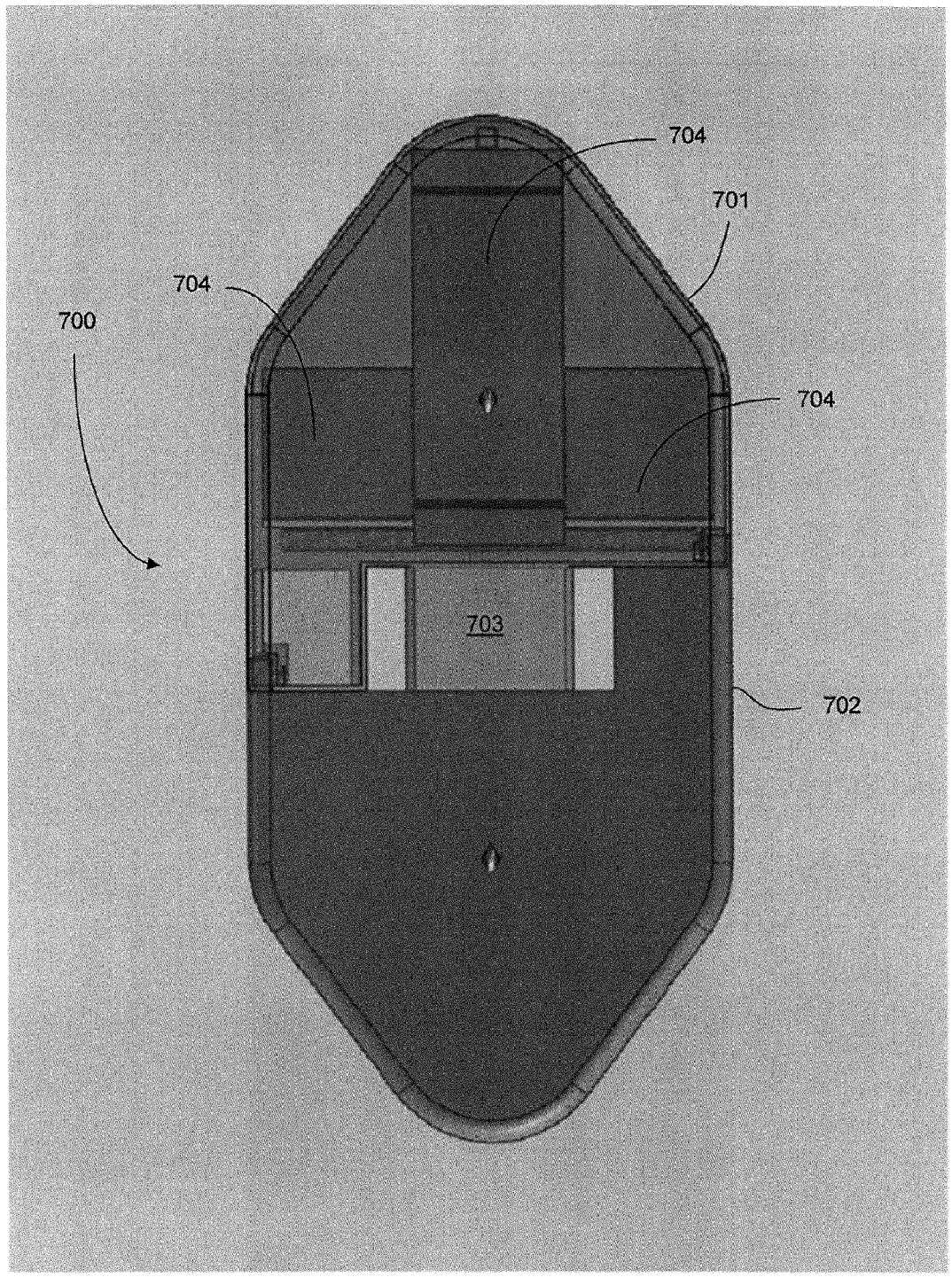
FIG. 5 shows a plan view of a housing which includes a number of energy absorbing devices as shown in FIG. 1 in accordance with a still further preferred embodiment of the present invention.

FIG. 5 shows an alternate modular safety device 700. The modular safety device 700 has a first housing 701 connected via bolts (not shown) to a second housing 702. The modular safety device 700 surrounds a power pole 703. The first housing 701 has had the top of the housing removed in order to show the energy absorbing devices 704 which are located therein. As can be seen the centrally located energy absorbing device of which only the top one of a stack of two can be seen is horizontally orientated (i.e. lying down). By way of contrast the side energy absorbing devices on either side of the centrally positioned stack of devices are orientated vertically (i.e. standing up).

Aspects of the present invention have been described by way of example only and it should be appreciated that modifications and additions may be made thereto without departing from the scope of the appended claims.

I claim:

1. An energy absorbing device comprising:
   an enclosed shell forming a barrier between a hollow interior and an exterior of the shell, said shell comprising side walls and end walls together defining a sealed internal volume within said enclosed shell; and
   one or more interior walls in said sealed volume of said enclosed shell, wherein said one or more interior walls define at least one additional internal space in the form of a void within the hollow interior of the enclosed shell, wherein said one or more interior walls span between opposing ends of said enclosed shell such that said at least one additional internal space spans completely across the enclosed shell along a major axis of the enclosed shell, said at least one additional internal space being open to the ambient environment.

2. The energy absorbing device as claimed in claim 1 wherein, in use, the at least one additional space spans across the enclosed shell in a direction substantially parallel or orthogonal to the general direction in which an impact is expected.

3. An energy absorbing device as claimed in claim 1 wherein the exterior and interior walls are integrally formed.

4. The energy absorbing device as claimed in claim 1 wherein the enclosed shell is made from substantially inflexible material.

5. The energy absorbing device as claimed in claim 4 wherein the substantially inflexible material is medium density polyethylene.

6. The energy absorbing device as claimed in claim 1 wherein the sealed volume is substantially airtight.

7. The energy absorbing device as claimed in claim 1 wherein the enclosed shell is substantially rectangular in shape.

8. The energy absorbing device as claimed in claim 1 wherein the at least one additional space formed by the interior walls has a substantially circular or octagonal cross-sectional shape.

9. The energy absorbing device as claimed in claim 1 wherein the interior walls of the energy absorbing device are formed from a substantially inflexible material which is the same material used to form the enclosed shell.

10. The energy absorbing device as claimed in claim 1 wherein the device includes a plurality of additional internal spaces defined by interior walls, the additional internal spaces are orientated to be aligned parallel with respect to each other within the energy absorbing device.

11. A housing adapted for surrounding stationary objects, wherein said housing includes a number of energy absorbing devices as claimed in claim 1.

12. A housing which includes a number of energy absorbing devices as claimed in claim 1 wherein the housing is configured as a module which can connect to one or more other modules so as to provide an impact cushion which can surround the stationary object.

13. An energy absorbing device as claimed in claim 1 wherein the enclosed shell is configured to function as a module.

14. The energy absorbing device as claimed in claim 1 wherein said one or more interior walls are in the form of tubes, each of said tubes having two ends, each end meeting the enclosed shell, and wherein each of said tubes makes no contact with any other of the tubes, or the enclosed shell, except where the ends of each of said tubes meet the enclosed shell.

15. A method of manufacturing a device to absorb impact energy, comprising: the step of creating an enclosed shell forming a barrier between a hollow interior and an exterior of the shell, said shell comprising side walls and end walls defining a sealed internal volume within said enclosed shell, the sealed internal volume being distinct from the exterior of the enclosed shell, wherein said sealed volume is further defined by one or more interior walls,
   wherein said one or more interior walls define at least one additional internal space in the form of a void within the energy absorbing device, wherein said at least one additional internal space spans completely across the enclosed shell along a major axis of the enclosed shell, said at least one additional internal space being open to the ambient environment.

16. A method of surrounding a stationary object, the method comprising:
   connecting two or more housings which include a number of energy absorbing devices each having an enclosed shell forming a barrier between a hollow interior and an exterior of the shell, said shell comprising side walls and end walls together defining a sealed internal volume within said enclosed shell; and
   one or more interior walls in the hollow interior, wherein said interior walls define at least one additional internal space in the form of a void within the energy absorbing device, wherein said at least one additional internal space spans completely across the enclosed shell along a major axis of the enclosed shell;
   wherein the housing is configured as a module which is connected to one or more other modules so as to provide an impact cushion which can surround the stationary object;
   or connecting two or more energy absorbing devices each having an enclosed shell forming a barrier between a hollow interior and an exterior of the shell, said shell comprising side walls and end walls together defining a sealed internal volume within said enclose shell, the sealed volume being distinct from the exterior of the enclosed shell, wherein said sealed volume is further defined by one or more interior walls,
   wherein said one or more interior walls define at least one additional internal space in the form of a void within the enclosed shell, wherein said at least one additional internal space spans completely across the enclosed shell along a major axis of the enclosed shell, said at least one additional internal space being open to the ambient environment;
   wherein the enclosed shell is configured to function as a module, so as to surround the stationary object.

* * * * *